(12) United States Patent
Hebert et al.

(10) Patent No.: US 8,301,776 B2
(45) Date of Patent: Oct. 30, 2012

(54) SWITCHED STREAM SERVER ARCHITECTURE

(75) Inventors: Marc I. Hebert, Portland, OR (US); Jonasan C. Ho, Portland, OR (US); Christopher E. McGinnis, Portland, OR (US); Matthew D. Phillips, Hillsboro, OR (US); Robert C. Duzett, Hillsboro, OR (US)

(73) Assignee: ARRIS Solutions, Inc., Suwanee, GA (US)

( * ) Notice: Subject to any disclaimer, the term of this patent is extended or adjusted under 35 U.S.C. 154(b) by 360 days.

(21) Appl. No.: 12/272,773

(22) Filed: Nov. 17, 2008

(65) Prior Publication Data

US 2009/0138601 A1    May 28, 2009

Related U.S. Application Data

(60) Provisional application No. 61/003,795, filed on Nov. 19, 2007.

(51) Int. Cl.
*G06F 15/173* (2006.01)
(52) U.S. Cl. ........................ 709/226; 709/238
(58) Field of Classification Search .................. 709/226, 709/238
See application file for complete search history.

(56) References Cited

U.S. PATENT DOCUMENTS

| | | | | |
|---|---|---|---|---|
| 5,894,554 A * | 4/1999 | Lowery et al. | ............... | 709/203 |
| 6,065,046 A * | 5/2000 | Feinberg et al. | ............... | 709/216 |
| 6,330,606 B1 * | 12/2001 | Logue et al. | ............... | 709/226 |
| 6,647,421 B1 * | 11/2003 | Logue et al. | ............... | 709/226 |
| 6,760,765 B1 * | 7/2004 | Asai et al. | ............... | 709/226 |
| 6,857,012 B2 * | 2/2005 | Sim et al. | ............... | 709/222 |
| 6,985,956 B2 * | 1/2006 | Luke et al. | ............... | 709/229 |
| 7,194,522 B1 * | 3/2007 | Swildens et al. | ............... | 709/217 |
| 7,502,836 B1 * | 3/2009 | Menditto et al. | ............... | 709/217 |
| 7,680,938 B2 * | 3/2010 | Oesterreicher et al. | ....... | 709/226 |
| 2002/0010798 A1 * | 1/2002 | Ben-Shaul et al. | ........... | 709/247 |
| 2003/0065762 A1 * | 4/2003 | Stolorz et al. | ............... | 709/223 |
| 2004/0003101 A1 * | 1/2004 | Roth et al. | ............... | 709/231 |
| 2004/0078467 A1 * | 4/2004 | Grosner et al. | ............... | 709/226 |
| 2004/0088412 A1 * | 5/2004 | John et al. | ............... | 709/226 |
| 2005/0033858 A1 * | 2/2005 | Swildens et al. | ............... | 709/232 |
| 2005/0262246 A1 * | 11/2005 | Menon et al. | ............... | 709/226 |
| 2006/0143350 A1 * | 6/2006 | Miloushev et al. | ........... | 710/242 |
| 2006/0230170 A1 * | 10/2006 | Chintala et al. | ............... | 709/231 |
| 2006/0248213 A1 * | 11/2006 | Sherer et al. | ............... | 709/231 |
| 2007/0168517 A1 * | 7/2007 | Weller et al. | ............... | 709/226 |
| 2007/0233706 A1 * | 10/2007 | Farber et al. | ............... | 707/10 |
| 2008/0313189 A1 * | 12/2008 | Mehta et al. | ............... | 707/10 |

OTHER PUBLICATIONS

Bunt, Richard B. Achieving Load Balance and Effective Caching in Clustered Web Servers. Apr. 1999. pp. 1-11.*

* cited by examiner

*Primary Examiner* — Imad Hussain
(74) *Attorney, Agent, or Firm* — Troy A. Van Aacken; Robert J. Starr

(57) ABSTRACT

A method for allocating content requests to a server pool includes directing a stream requesting a novel title to one of a least-busy server in a server pool and a least-miss-traffic server in the server pool; setting the server to which the novel title was directed to the requested title's preferred server; directing a stream requesting a familiar title to the title's preferred server; and directing a stream requesting a crowded title to one of a least-busy server and the least-miss-traffic server.

11 Claims, 6 Drawing Sheets

SWITCHED STREAM SERVER ARCHITECTURE

PRIORITY CLAIM

This application claims priority under 35 USC 119 to U.S. provisional application No. 61/003,795 filed on Monday, Nov. 19, 2007, which is incorporated herein by reference.

TECHNICAL FIELD

The present disclosure relates to serving of media streams over a data network.

BACKGROUND

The efficiency of an on-demand streaming system may be measured by its effective use of server, storage, and network resources; its ability to scale those resources to meet growing demands in as close to a linear relationship as possible; and its ability to predictably meet streaming demand with as few disruptions or denials of service as possible. For example, such a system may minimize the replication of content storage except as specified by redundancy and reliability requirements or to increase overall efficiency through caching; minimizing cache resources while maximizing the effective efficiency and scalability of those resources; balancing the overall streaming load across multiple servers, when scaled, to match their respective capacities and provisioning; optimizing usage and efficiency of network elements interconnecting system elements or connecting to outside infrastructure; and maximizing peak utilization of all of these resources, across a range of scalability, while minimizing disruptions or denials of media streaming requests.

A shared global cache in a multi-node stream server is facilitated by the provision of a high-speed back-side network that interconnects the nodes together in such a way that any node may access the content cached on any other node at bandwidths sufficient to support the full streaming capacity of the server.

An advantage of a shared global cache is that only one copy of any given content ever needs to be stored in the collective cache memory of all the nodes. The content stored in any individual node's cache memory is unique to that memory and is not replicated on any other node's cache memory. As a result, the cumulative cache memory of all the nodes together comprises, and behaves as, one effective monolithic cache. The large collective size of the global cache, combined with its total lack of content replication, maximizes caching efficiency, as measured by the cache hit rate.

A global cache is especially effective if independent, content files, volumes, or other logical storage entities are fractured into small uniform-sized blocks and mapped in a striped fashion across all the cache memories of all the nodes comprising the global cache. This arrangement ensures a balanced access load across all the nodes and their interconnecting back-side network, no matter what the content access pattern.

A well-designed shared global cache has three main characteristics: 1) a high-speed back-side interconnect that facilitates shared access to all the cache content; 2) unique content at every node; and 3) balanced access load to and from all nodes. The first characteristic would appear to uniquely enable the second and third. The high-speed globally-shared interconnect enables globally-shared unique content and balanced striped content.

BRIEF DESCRIPTION OF THE DRAWINGS

In the drawings, the same reference numbers and acronyms identify elements or acts with the same or similar functionality for ease of understanding and convenience. To easily identify the discussion of any particular element or act, the most significant digit or digits in a reference number refer to the figure number in which that element is first introduced.

DETAILED DESCRIPTION

Figure 1:
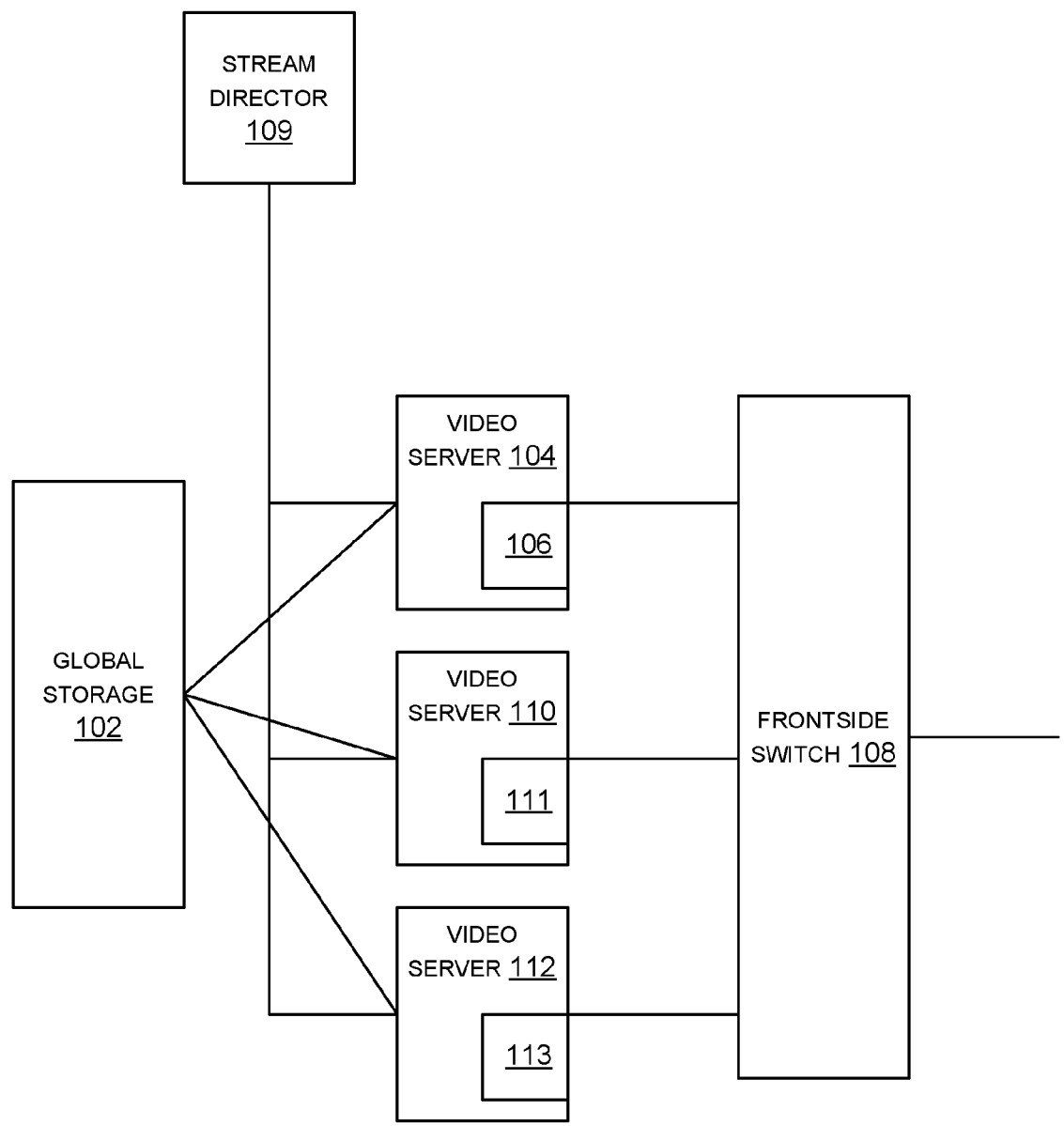
FIG. 1 is an illustration of an embodiment of a stream-switched video server farm architecture.

References to "one embodiment" or "an embodiment" do not necessarily refer to the same embodiment, although they may.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list.

"Logic" refers to signals and/or information that may be applied to influence the operation of a device. Software, hardware, and firmware are examples of logic. Hardware logic may be embodied in circuits. In general, logic may comprise combinations of software, hardware, and/or firmware.

Those skilled in the art will appreciate that logic may be distributed throughout one or more devices, and/or may be comprised of combinations of instructions in memory, processing capability, circuits, and so on. Therefore, in the interest of clarity and correctness logic may not always be distinctly illustrated in drawings of devices and systems, although it is inherently present therein.

Overview

An on-demand media streaming system in accordance with the principles described herein may comprise multiple distributed "parts" or "nodes"—servers, sub-systems, and/or elements. These nodes may behave as generally independently-acting members with locally-controlled resources, and are to be distinguished from tightly-clustered systems in which member servers, sub-systems, and elements share or have easy access to each others', and/or centrally-controlled, globally-shared resources. An on-demand media streaming system in accordance with the principles described herein may 1) place content titles, and 2) direct stream requests, to various nodes of a distributed system in such a way as to optimize system resources (content storage, cache, server, network) as well as minimize unexpected service denials.

Unlike a shared global cache, the cache memory in an individual streaming server of a distributed architecture without a backside interconnect is strictly local, in that the video content stored in an individual server's cache may only be used for streams driven directly from that server. It is not shared by, nor accessible by, any other server. There is no high-speed back-side interconnect to enable shared access.

To improve the cache efficiency in distributed architectures, one should aspire to maximize the uniqueness of the content at each streaming server, and balance the load across all the streaming servers, without building a high-speed backside interconnect to cluster them together.

If a system of local caches may be managed such that most or all of the content on any of the local caches is unique to that local cache, i.e. its content is not replicated on other local caches, the overall cache efficiency of the system may be similar to that of a global cache. This is because the effective size of the overall system cache is the cumulative amount of unique content stored in the caches. If the amount of unique content may approach the combined total size of all the local caches, then the cache hit rate will correspond to that total size, just as it does for a global cache.

Heterogeneous and Homogeneous Content

One embodiment of a distributed streaming system might spread the system's entire content library heterogeneously across all the nodes of the system, with no recourse or access to a central library storage, such that the content storage on each of the nodes is primary storage, part of the overall primary library. The placement/arrangement/layout of the library content dispersed to these various distributed nodes affects the efficiency and balance of the system in exactly the same way as the distributed cache described above, even though the storage within a node is primary storage and is not a cache per se, and even if the node contains no other cache per se. Any node's portion of a primary content library that is stored across a distributed array of nodes may be viewed as a "cached" portion of that library. Mechanisms to optimize efficient placement of content at that node or to optimize streaming efficiency from that node's content may be equally applicable to that node whether the content stored there is a portion of a primary library or a cached copy of a portion of a primary library.

In addition, if a node includes both primary content storage as well as cache storage (caching the primary storage located on the node), the mechanisms and algorithms utilized to optimize efficient use of the heterogeneous primary storage will also optimize the efficiency of the local cache and overall efficiency of the system-wide totality of cache, because uniqueness of cache content and balance of streaming load may be optimized.

If primary library content is copied in its entirety, or even "mostly" i.e. with a high degree of replication, to each of the nodes in a distributed system, this content distribution is considered to be homogeneous in that every node has easy access to all (or mostly all) the library's content. In this situation, the primary content storage is not particularly efficient from a storage resource perspective because of the high degree of content replication. However, any additional cache storage associated with these nodes may still be made to be efficient by applying mechanisms and algorithms that minimize replication of content in the caches of the nodes across the system. For example, the judicious directing of stream requests to different nodes may ensure that the content sourcing those actual streams is unique to, and uniquely cached by, independent nodes; and that the streaming load is still spread as evenly as possible across the array of participating nodes. In other words, the overall system cache is efficient because the "active" content of each node is unique, even though the total stored content at each node, including its "inactive" content, is not unique.

Hierarchy

A distributed streaming system that includes, or is connected to, a central library server (or any library server commonly accessible to multiple distributed nodes) is considered hierarchical. Most or all of a common library, whether it be central, regional, or local, is stored at the central server, while portions of that library may be stored as copies in one or more of the nodes of the distributed system at the "edge". These stored portions (group of selected "titles" from the central library), considered singly within a node or collectively across an array of nodes, comprise a cache and may be optimized in the same way and with the same mechanisms and algorithms as the cache structures described above. In addition, a hierarchy may comprise more than two levels and similar optimization approaches may be applied at multiple levels.

Note that multiple levels of hierarchy may exist within a single distributed node, including some of the examples given in the section above about heterogeneous and homogeneous content. It is possible for all the levels within a streaming server (node) to be cache levels. These may sometimes be referred lo as a multi-tiered cache. Multi-tiered caches may also span across both internal and system tiers of hierarchy.

Architectures

A content distribution system in accordance with the techniques and principles described herein may 1) place content titles on, and 2) direct stream requests to the nodes of a distributed system for optimum system efficiency. There are multiple architectures within which the placement of titles and the directing of streams may be accomplished in differing ways:

In a fully-directed approach, control software directly places selected content on specific nodes; directs stream requests to nodes of a system based on the content residing at the various nodes and the current status of the nodes; and migrates or re-distributes the content on the nodes based on recent behavior of the streaming load and/or content profile. If a content title requested for streaming does not reside on any of the nodes, or none of the nodes may successfully source the stream (e.g. all nodes are fully busy), the request may be denied, or it may be "streamed-around" an edge node by a central server (if it exists and the network may handle it). The control software manages the content placement, caching efficiency, and streaming balance by directly placing, moving, and deleting content and directing streams.

In a pull-through approach, control software (the "stream director") merely directs a stream request to a specific node, which then plays the content if it resides on the node or else "pulls" the content from a central library (or other library up the hierarchy) into the node to play it and possibly store it (e.g. store it in cache if its popularity factor is high enough). If none of the nodes in the array may successfully source a requested stream (e.g. all nodes are fully busy), the request may be denied, or it may be "streamed-around" an edge node by a central server (if it exists and the network may handle it). The control software manages the content placement, caching efficiency, and streaming behavior indirectly by choosing where to direct streams. It may also selectively place content, especially new titles, based on metadata or other logic. It may also selectively delete content.

In a look-aside architecture, control software directs streams to the lowest level of storage in the hierarchy (system and/or internal node storage hierarchy, as visible to the control software) that contains the requested title, causing it to stream-around any levels that, are lower still. A lower level of storage (i.e. cache) will swap-in a title, by direction of its own local cache manager or by higher-level control software, when the popularity of the title surpasses a threshold of popularity for that level (e.g. the popularity factor of the least-popular entry in the cache).

Note that multiple storage levels may exist within the node, outside the node, or spanning across the internal-node-to-external system boundary and that some levels of storage may be directly managed while other levels may be indirectly managed via pull-through or look-aside. For example, control software may directly manage content stored in a node as primary content or as a large top-tier cache stored on drives, while the lower-tier RAM cache may act as pull-through or as an independent look-aside cache mechanism; or, control software may directly replicate some of the content on multiple nodes, but maintain unique "active" content as much as possible merely by way of judiciously directing streams among the nodes (see Replication, below).

In any of the above architectures, choices about content placement and/or streaming locations are made based on system and node status and/or recent content access profiling (e.g. to determine most popular content titles). Mechanisms and algorithms are applied to optimize the resulting system behavior, capacity, and resource utilization.

Replication

In addition to meeting requirements that may exist for redundancy, content titles may also be replicated on more than one node in a distributed system so as to increase efficiency or flexibility when choosing which node will stream a given request. Replicated titles will of course reduce the uniqueness of content and thus potential storage efficiency of a node or storage level, whether that storage is cache or primary storage. A trade-off may be made in favor of overall system efficiency, capacity, or provisioning of other resources at the cost of additional storage. For example, a random distribution of content titles across an array of nodes, without any replication, may result in some probability of stream denials when trying to load the system at peak streaming capacity; yet by replicating the 10 or 20 most popular titles at every node the probability may be cut substantially. Even though some titles are replicated across multiple nodes, streams may be directed in such a way as to maximize the uniqueness of all the "active" content—in other words, streams for a given replicated title might be directed exclusively to one node except and until load balancing requires that some of those streams be directed elsewhere, and even after that, a preference might be maintained for just one or a small subset, of the total nodes storing that title.

Methods and algorithms controlling the placement of content and directing of stream requests may include accommodation for replicating of titles across one or more of the nodes of a distributed system.

Parameters and Metrics

There are several parameters and metrics that may be used in making algorithmic decisions about content placement and stream direction. These include, but are not limited to, storage utilization, streaming capacity utilization, cache hits & misses, hit rates and/or miss rates, network traffic utilization, title popularity counts or statistics, bandwidth utilization of a storage array, cache ease-of-entry metrics (e.g. the popularity factor of the lowest or highest cache entry), per-title metadata or history, overall content profile or popularity sort, per-node configurations, system size (# of nodes), pre-determined threshold definitions of "full", "popular", etc.

These and other parameters may be used in various different algorithms and based on differing time domains and sampling periods.

Exemplary Systems and Techniques

FIG. 1 is an illustration of an embodiment of a stream-switched video server farm architecture. Various components of FIG. 1, for example the stream director 109 and/or video servers 104, 110, 112 may comprise logic to carry out all or portions of various procedures described herein. The architecture includes, but may not be limited to, global content storage 102, video server 104 with local video server cache 106, video server 110 with local video server cache 111, video server 112 with local video server cache 113, a frontside switch 108, and a stream director 109. Other elements and/or couplings among the elements have been omitted as they would be apparent to skilled practitioners in the relevant art(s).

The global storage 102 is a centralized content storage location, such as, for example, one or more RAID farm, server cluster, or hybrid disc-solid state storage facility. The video server 104 is a content caching and stream serving data processing device, such as, for example, one or more computing systems with appropriate logic for high-performance media streaming. The video server 104 (and likewise video servers 110, 112) retrieve content from global storage 102, caches at least a portion of the content in local cache facilities 106, and streams the content to the frontside switch 108 in response to requests to view titles.

The local video server cache 106 is a caching of content served by video server 104, such as, for example, one or more various types of volatile, fast, random-access memory technologies known in the art (likewise for local caches 111, 113). The frontside switch 108 switches streams from the video servers 104, 110, 112 to downstream destinations, such as, for example, one or more local customer geographies served by one or more HFN (hybrid fiber-coax node).

The stream director 109 assigns stream requests to the appropriate stream server, which obtains the stream either before streaming begins, or on-demand as streaming progresses, from global storage 102. The stream director 109 also controls frontside switch 108 to route the streams to the appropriate destination.

The stream director 109 may comprise one or more one or more computing systems comprising logic to carry out procedures as disclosed herein. Other examples and/or embodiments of a global storage 102, video servers 104, 110, 112, frontside switch 108, and stream director 109 may be apparent to skilled practitioners in the relevant art(s).

Figure 2:
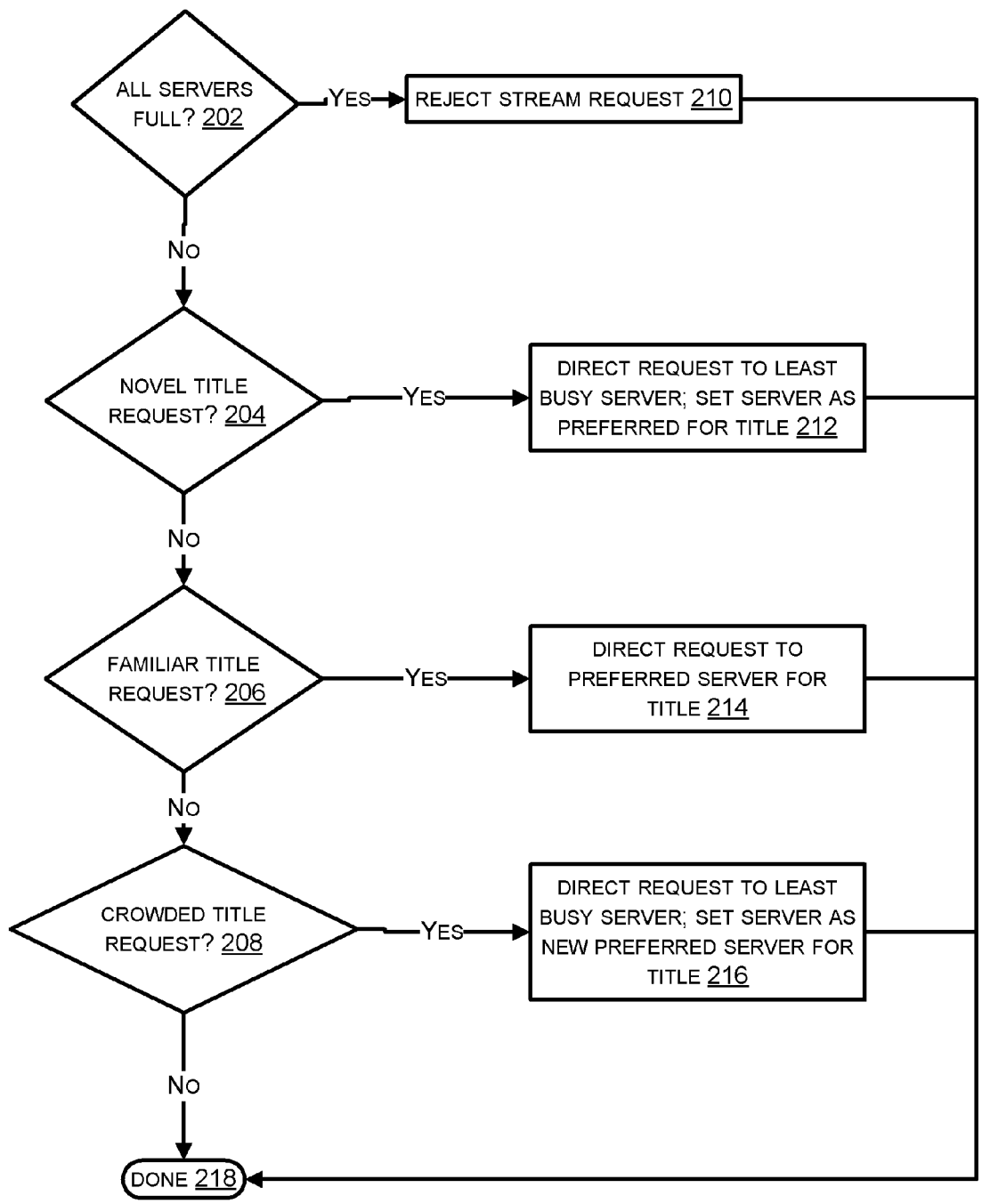
FIGS. 2-4 are flow charts of embodiments of stream direction procedures providing load and cache management in a stream-switched architecture.
Figure 3:
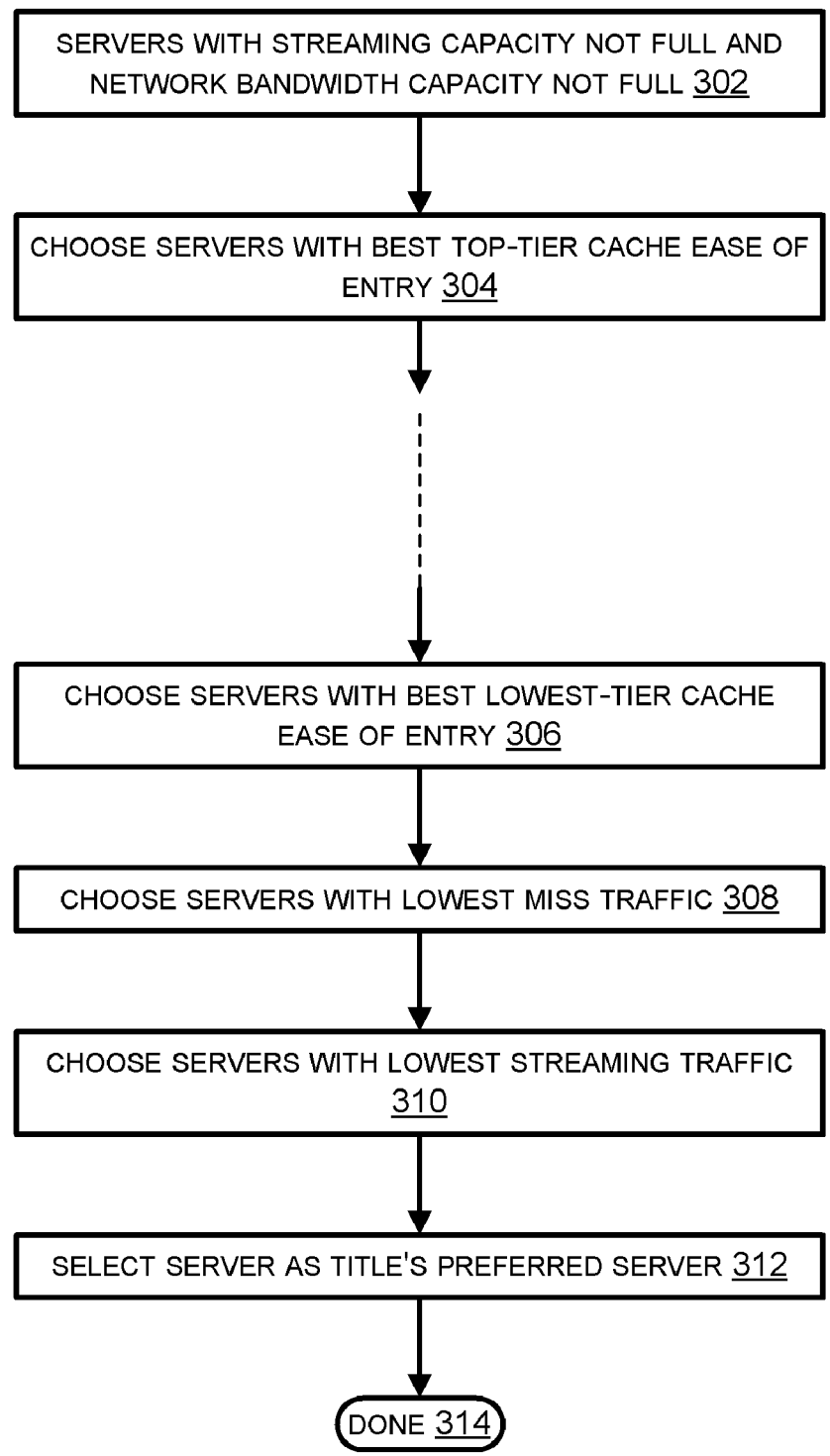
Figure 4:
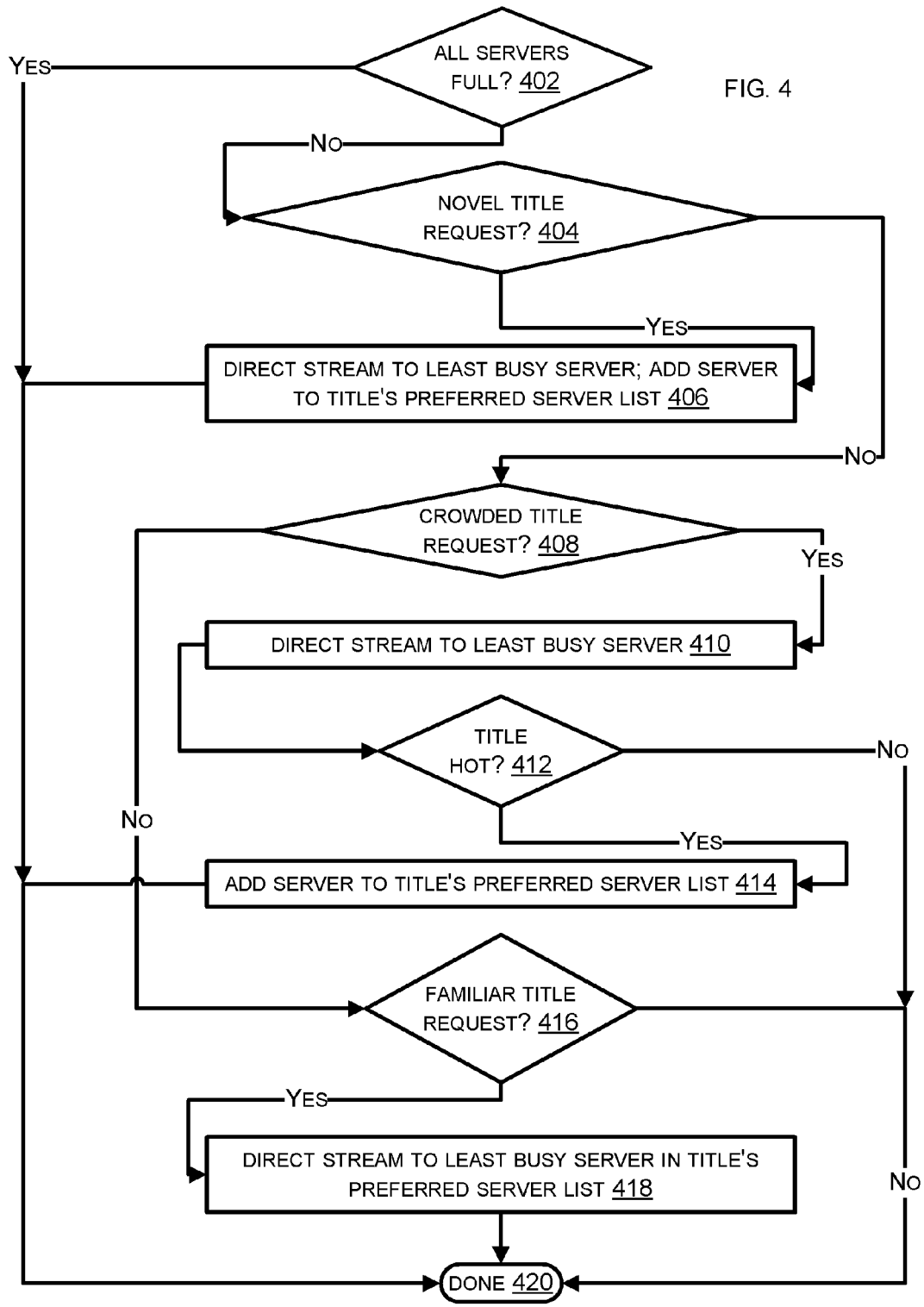

FIGS. 2-4 are flow charts of embodiments of stream direction procedures providing load and cache management in a stream-switched architecture.

Definitions:

The "global pool" of servers is the aggregate collection of servers sharing a front-side switch or network.

A server is "least-busy" or "most-busy" based on its streaming load (in % of its own streaming capacity, i.e. not necessarily in absolute streams or sessions) compared to that of other servers.

A server is "full" if its streaming capacity, or other critical resource, is saturated (potentially incapable of adequately handling an additional stream).

A title is "novel" if it has no preferred server.

A title is "familiar" if its preferred server is not "full".

A title is "crowded" if its preferred server is "full".

"migration" is defined as the changing of a non-empty preferred server field from one server to another.

"Miss traffic" is the bandwidth required to pull in title content for streaming when that content is not in the cache. The "least miss traffic" server is the server that currently has the lowest rate of cache misses, and thus the lowest demand (percentage-wise) on its incoming network port or cache tier interface.

"Cache tiers": It is sometimes advantageous to have more than one level of cache. A multi-tiered cache may comprise two or more cache layers, each one with different characteristics, for example in type of memory, speed of memory, storage capacity of memory, and/or cost of memory. Engineering analysis may use cost-performance and other factors to make provisioning trade-offs across the different cache tiers to determine the most advantageous provisioning mix among them. For the purposes of this description, the lowest tier of cache may be viewed as the tier "closest" to the streaming IO of the server. It tends to be the smallest but fastest of the cache tiers and would generally contain the most popular content, which may be a subset of the content in the next higher cache tier, with the top cache tier generally being the largest and slowest and often containing a superset of the content within the lower tiers of cache.

"cache ease of entry" is a measure of how much streaming activity is required of a title or block of streaming content, to make it sufficiently active to replace the next replacement entry of the cache, which is likely to be defined as the lowest-activity title or block currently in the cache. For example, if there is a popularity metric for each entry in a cache, the ease of entry for that cache is the lowest popularity metric value of all the entries.

"preferred server" of a given title is the server that is preferred to source future streams for that title. Any one or number of parameters could be sampled to determine which server should be preferred for a title, including current title storage location(s), current server streaming loads, miss traffic, network loads, cache ease-of-entry, cache hit-rate, server content capacity load, title history or metadata, etc.

Referring to FIG. 2:

Actions:

If all servers in the "global pool" are "full", reject any stream request; otherwise, perform one or more of the following actions. (202, 210)

Direct a stream requesting a "novel" title to the least-busy server in the global pool; this server now becomes the requested title's "preferred server". (204, 212)

Direct a stream requesting a "familiar" title to the title's preferred server. (206, 214)

Direct a stream requesting a "crowded" title to the least-busy server of the global pool. (208, 216). This server becomes the title's new preferred server, i.e. the title has "migrated" to that server.

Figure 2A:
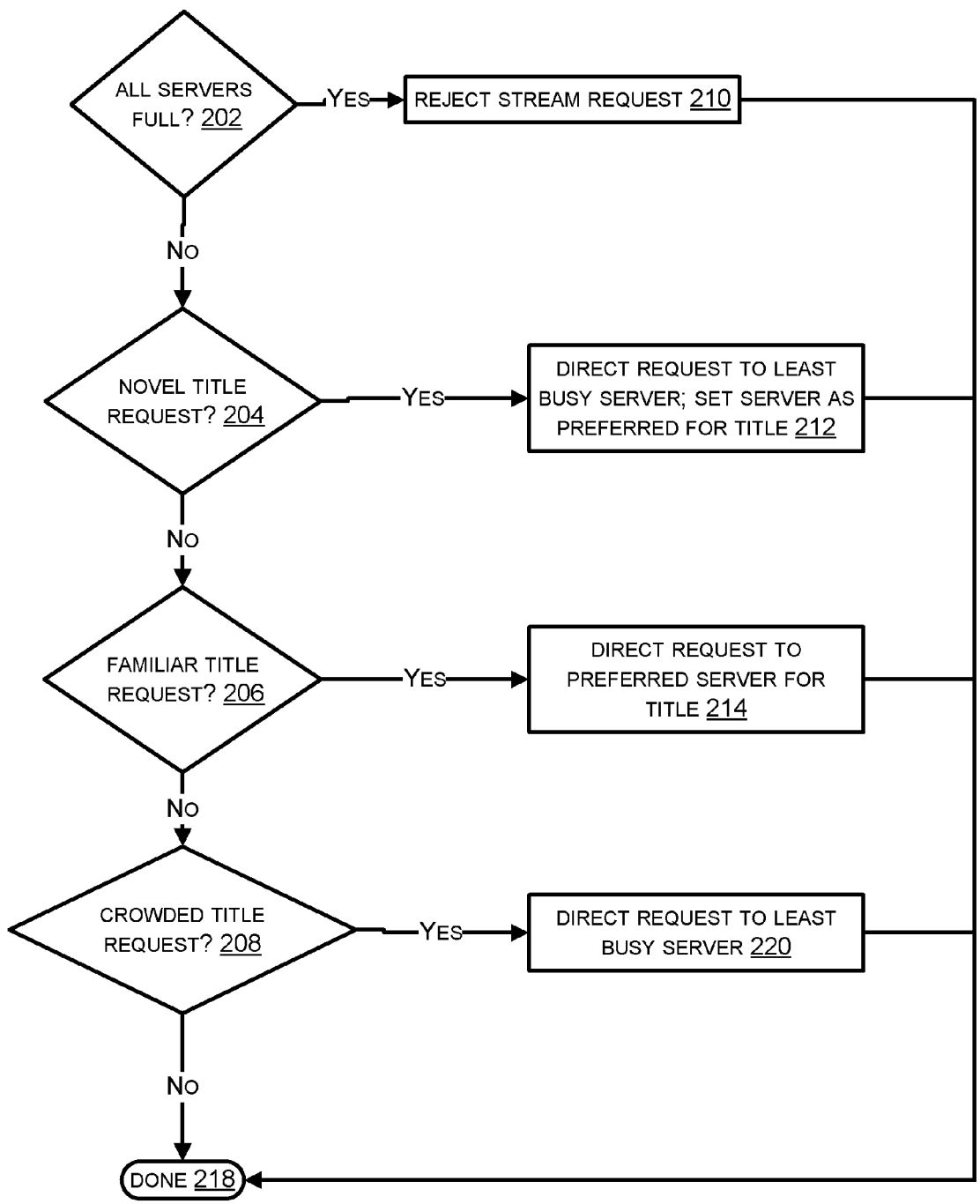

Referring to FIG. 2A:

Actions:

If all servers in the "global pool" are "full", reject any stream request; otherwise, perform one or more of the following actions. (202, 210)

Direct a stream requesting a "novel" title to the least-busy server in the global pool; this server now becomes the requested title's "preferred server". (204, 212)

Direct a stream requesting a "familiar" title to the title's preferred server. (206, 214)

Direct a stream requesting a "crowded" title to the least-busy server of the global pool. (208, 220). This server does not become the title's new preferred server, i.e. the title is not "migrated" to that server.

The cache behavior is generally more effective/efficient if the selection of the preferred server doesn't thrash (change often). The "crowding" of a title is potentially temporary, and the requested title isn't necessarily a major contributor to the crowding, and the cache hit rate for that title may be diluted and have to be re-established on another server if the preferred server for the title is thrashed. Thus, in some embodiments the server preference, once established, remains in place until it is reset/cleared, after which a new request for the title will select a new preferred server by the established method for a new (e.g. 'novel' title).

Figure 2B:
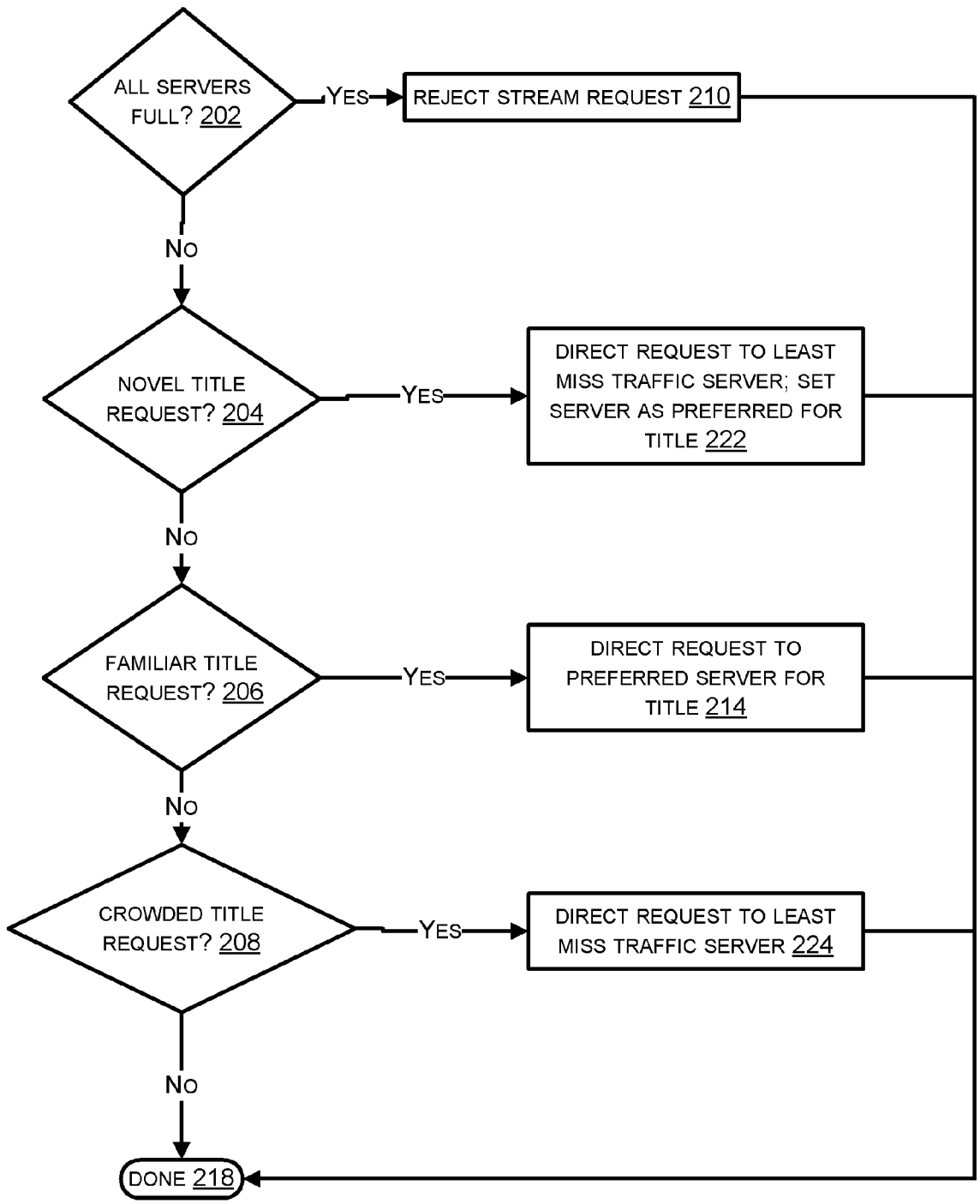

Referring to FIG. 2B:

Actions:

If all servers in the "global pool" are "full", reject any stream request; otherwise, perform one or more of the following actions. (202, 210)

Direct a stream requesting a "novel" title to the least-miss-traffic server in the global pool; this server now becomes the requested title's "preferred server". (204, 222)

Direct a stream requesting a "familiar" title to the title's preferred server. (206, 214)

Direct a stream requesting a "crowded" title to the least-miss-traffic server of the global pool. This server does not. become the title's new preferred server, i.e. the title is not "migrated" to that server. (208, 224)

Referring to FIG. 3:

Direct a new title to the server first meeting the following considerations in order:

streaming capacity is not "full" and network bandwidth capacity is not "full" (302)

from servers equal in all of the above, choose the server whose top-tier cache ease-of-entry is better than that of the others; otherwise, (304)

from servers equal in all of the above, choose the server whose next-lower-tier cache ease-of-entry is better than that of the others; otherwise, (306)

from servers equal in all of the above, choose the server whose lowest-tier cache ease-of-entry is better than that of the others; otherwise, (308)

from servers equal in all of the above, choose the server whose miss traffic is lower (in percentage of capacity) than that of the others; otherwise, (310)

from servers equal in all of the above, choose a server whose streaming traffic is lower (in percentage of capacity) than or equal to that of the others. (312)

The selected server becomes that title's one and only preferred server.

Referring to FIG. 4:

Definitions.

The "global pool" of servers is the aggregate collection of servers sharing a front-side switch or network.

A server is "least-busy" or "most-busy" based on its streaming load (in % of its own streaming capacity, i.e. not necessarily in absolute streams or sessions) compared to that of other servers.

A server is "full" if its streaming capacity, or other critical resource, is saturated (potentially incapable of adequately handling an additional stream).

A title is "hot" if it is the most active title for one of the servers (see Stream Director: Server state: above).

A title is "novel" if it has an empty preferred servers list, i.e. it has no preferred server.

A title is "familiar" if it has at least one preferred server that is not "full".

A title is "crowded" if all of its preferred servers are "full".

"replication" is defined as the addition of a server to a title's non-empty preferred-servers list.

A title has "cooled" if it has more than one server on its preferred-servers list, but it is no longer "hot" (does not show up as the most-active title for any of the servers).

Actions:

If all servers in the "global pool" are "full", reject any stream request; otherwise, perform one or more of the following actions. (402)

Direct a stream requesting a "novel" title to the least-busy server in the global pool; add that server to the requested title's "preferred-servers" list. (404, 406)

Direct a stream requesting a "familiar" title to the least-busy server from the requested title's preferred-servers list. (416, 418)

Direct a stream requesting a "crowded" title to the least busy server in the global pool; if, and ONLY if, the title is "hot", "replicate" the title by adding the least-busy server to the title's preferred-servers list. (408, 410, 412, 414)

Check each title periodically (every 'N' minutes? or 'N' session starts?) for an opportunity to remove some servers from its preferred list. If a title has "cooled", and at least one of the servers on its list is not full, remove the "most-busy" of the servers on the title's preferred-servers list. Also, at known low-demand points in each 24-hour period, the preferred-servers lists of all the titles may be cleared or initialized.

Those having skill in the art will appreciate that there are various vehicles by which processes and/or systems described herein may be effected (e.g., hardware, software, and/or firmware), and that the preferred vehicle will vary with the context in which the processes are deployed. For example, if an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle may be deployed and the specific concerns (e.g., speed, flexibility, or predictability) of the implementer, any of which may vary. Those skilled in the art will recognize that, optical aspects of implementations may involve optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it may be understood as notorious by those within the art that each function and/or operation within such block diagrams, flowcharts, or examples may be implemented, individually and/or collectively, by a wide range of hardware, software, firmware, or virtually any combination thereof. Several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

In a general sense, those skilled in the art will recognize that the various aspects described herein which may be implemented, individually and/or collectively, by a wide range of hardware, software, firmware, or any combination thereof may be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment).

Those skilled in the art. will recognize that it is common within the art to describe devices and/or processes in the fashion set forth herein, and thereafter use standard engineering practices to integrate such described devices and/or processes into larger systems. That is, at least a portion of the devices and/or processes described herein may be integrated into a network processing system via a reasonable amount of experimentation.

The foregoing described aspects depict different components contained within, or connected with, different other components. It is to be understood that, such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality.

What is claimed is:

1. A method comprising: directing a stream requesting a novel title to one of a least-busy server in a server pool and a least-miss-traffic server in the server pool, even if the novel title is already cached on a not full server that is not the least busy or least miss server in the pool; setting the server to which the novel title was directed to the requested title's preferred server, directing a stream requesting a familiar title to the title's preferred server, even if the familiar title is not already cached on the preferred server, directing a stream requesting a crowded title to one of a least-busy server and the least-miss-traffic server.

2. The method of claim 1, further comprising: the server to which the crowded title is directed does not become the title's new preferred server.

3. A method comprising: directing a stream requesting a novel title to a least-busy server of a server pool; adding the server to which the novel title was directed to the requested title's preferred-servers list; directing a stream requesting a familiar title to the least-busy server from the requested title's preferred-servers list, where the preferred servers list comprises at least one server that does not already cache the familiar title.

4. The method of claim 3, further comprising: directing a stream requesting a crowded title to the least busy server in the server pool.

5. The method of claim 3, further comprising: checking one or more titles periodically for an opportunity to remove some servers that cache the title from the title's preferred list.

6. The method of claim 3, further comprising: if a title has cooled, and at least one of the servers on its preferred server list is not full, remove the most-busy of the servers on the title's preferred-servers list.

7. A server system comprising: non-transitory machine memory and/or circuits embodying logic to direct a stream requesting a novel title to a least-busy server of a server pool; add the server to which the novel title was directed to the requested title's preferred-servers list; direct a stream requesting a familiar title to the least-busy server from the requested title's preferred-servers list, where the preferred servers list comprises at least one server that does not already cache the familiar title.

8. The server system of claim 7, further comprising: non-transitory machine memory and/or circuits embodying logic to direct a stream requesting a crowded title to the least busy server in the server pool.

9. The server system of claim 7, further comprising: non-transitory machine memory and/or circuits embodying logic to add the least-busy server to the title's preferred-servers list if and only if the title is hot.

10. The server system of claim 7, further comprising: non-transitory machine memory and/or circuits embodying logic to check one or more titles periodically for an opportunity to remove some servers from the title's preferred list.

11. The server system of claim 7, further comprising: non-transitory machine memory and/or circuits embodying logic to if a title has cooled, and at least one of the servers on its preferred server list is not full, remove the most-busy, of the servers on the title's preferred-servers list.

* * * * *